United States Patent [19]

Watanabe et al.

[11] Patent Number: 4,616,069
[45] Date of Patent: Oct. 7, 1986

[54] PROCESS FOR MAKING DIENE POLYMER RUBBERS

[75] Inventors: Hiroyuki Watanabe, Yokohama; Kohkichi Noguchi, Kamakura; Toshio Kase, Tokyo; Shuichi Akita, Kamakura, all of Japan

[73] Assignee: Nippon Zeon Co., Ltd., Tokyo, Japan

[21] Appl. No.: 790,168

[22] Filed: Oct. 22, 1985

[30] Foreign Application Priority Data

Oct. 26, 1984 [JP] Japan .................................... 225495
Oct. 26, 1984 [JP] Japan .................................... 225496

[51] Int. Cl.$^4$ ............................................. C08F 8/00
[52] U.S. Cl. .................................. 525/370; 525/332.9; 525/333.2
[58] Field of Search ............... 525/332.7, 332.9, 333.1, 525/333.2, 374, 351, 370, 371

[56] References Cited

U.S. PATENT DOCUMENTS

| | | | |
|---|---|---|---|
| 3,468,972 | 9/1969 | Hsieh | 525/333.2 |
| 3,985,830 | 10/1976 | Fetters | 525/332.9 |
| 4,301,258 | 11/1981 | Lal | 525/333.1 |
| 4,301,259 | 11/1981 | Lal | 525/333.1 |
| 4,304,886 | 12/1981 | Bean | 525/333.1 |

Primary Examiner—Paul R. Michl
Attorney, Agent, or Firm—Sherman and Shalloway

[57] ABSTRACT

A process for making a diene polymer rubber which comprises reacting an active diene polymer rubber having alkali metal and/or alkaline earth metal terminals, which is obtained by polymerizing a conjugated diene monomer alone or together with an aromatic vinyl monomer in a hydrocarbon solvent, using an alkali metal and/or alkaline earth metal initiator, with (1) a tin compound expressed by the general formula $R_aSn_nX_b$ (in which R stands for an alkyl, alkenyl, cycloalkenyl or aromatic hydrocarbon group; X is a halogen atom; a is an integer of 0-2, and b is an integer of 2-4), and (2) at least one organic compound selected from the group consisting of aminoaldehydes, aminoketones, aminothioaldehydes, aminothioketones and the organic compounds having in their molecules

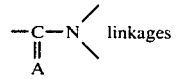 linkages (in which A stands for an oxygen or sulfur atom).

14 Claims, No Drawings

PROCESS FOR MAKING DIENE POLYMER RUBBERS

This invention relates to a process for making diene polymer rubbers. More particularly, the invention relates to a process for making diene polymer rubbers having improved processability and rebound, which comprises reacting a diene polymer having active alkali metal and/or alkaline earth metal terminals with a tin compound and a specific organic compound.

Recently the demand for a rubber material for tire tread of automobiles, which has a low rolling resistance (which corresponds to high rebound as a property of rubber material) and a high wet skid resistance is very strong, to meet the requirements for reducing the fuel cost and improving running safety of automobiles. However, those two properties are incompatible, and various proposals have been made to improve the polymers to bring about the favorable balance between the two properties. For example, there have been proposed a method in which the vinyl content and styrene content of a styrene-butadiene copolymer are adjusted to a specific ratio (Japanese Laid-open Patent Publication No. 62248/1979), a method in which specific styrene chain distribution is given to such a copolymer (Japanese Laid-open Patent Publication No. 143209/1981), a method in which specific vinyl linkage chain distribution is given to such a copolymer (Japanese Laid-open Patent Publication No. 149413/1981), and a method of introducing butadienyl-tin bond into the main chain of such a copolymer by coupling reaction (Japanese Laid-open Patent Publication No. 87407/1982).

A primary object of the present invention is to develop a rubber material which exhibits excellently balanced rolling resistance (rebound) and wet skid resistance, by a method other than those above-mentioned.

The present inventors previously discovered that the above object can be achieved by reacting alkali metal-added diene polymers with aminoaldehydes, aminoketones or organic compounds containing in their molecules

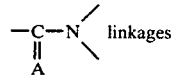

(in which A signifies an oxygen or sulfur atom) whereby to introduce specific atomic groups into said polymers. However, thus modified diene polymer rubbers show practically serious defect of inferior processability, typically inferior winding property onto open rolls and inferior extrudate shapes. The processability can be improved while retaining the improved rebound achieved by the introduction of aforesaid atomic groups, if Mooney viscosities of the polymers are reduced, but it produces a new defect of increased cold flow and inferior storage stability.

Accordingly, the object of the present invention resides in the provision of a rubber material showing well-balanced rolling resistance (rebound) and wet skid resistance and also good processability and storage stability.

This object of the present invention is achieved by the process comprising polymerizing a conjugated diene monomer, or that and an aromatic vinyl monomer, in a hydrocarbon solvent, using an alkali metal and/or an alkaline earth metal initiator; and reacting so obtained active diene polymer rubber having alkali metal and/or alkaline earth metal terminals with (1) a tin compound of the general formula, $R_aSnX_b$ (in which R stands for an alkyl, alkenyl, cycloalkyl or aromatic hydrocarbon group, X is a halogen atom, a is an integer of 0–2, and b is an integer of 2–4) and (2) an organic compound selected from aminoaldehydes, aminoketones, aminothioaldehydes, aminothioketones and organic compounds having in their molecules

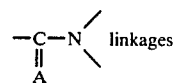

(in which A stands for an oxygen or sulfur atom).

The diene polymer rubbers produced through the above method of present invention are composed of the molecular chains formed by coupling of above active diene polymer rubbers by their reaction with the tin compounds (1) and the molecular chains formed by addition of above organic compounds (2) to the terminals of the polymers not participating in the reaction with said tin compounds (1), e.g., taking an example of aromatic aminoaldehyde, addition thereof in such a manner as:

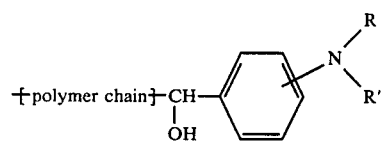

(in which R and R' stand for hydrogen atoms or same or different substituent groups).

The ratio of coupled molecular chains through the reaction with the tin compounds (1) to the molecular chains having the polymer terminals to which the organic compounds (2) are added, is optional, but preferably 1:9–9:1 (by weight). The ratio of the polymers having at their terminals the organic compounds (2) added is at least 20% by weight to the polymers which have not participated in the reaction with the tin compounds (1).

The order of the reaction with tin compounds (1) and the addition reaction with the organic compounds (2) is optional. That is, they may be performed sequentially by optional order, or they may be performed simultaneously. Obviously, if the above two reactions are to be performed in two stages, it is necessary to so control the amount of the compound added in the first stage as to leave some active polymer chains having unreacted alkali metal and/or alkaline earth metal terminals after the first stage reaction.

The active diene polymers having the alkali metal and/or alkaline earth metal terminals to be used in this invention can be obtained by polymerizing conjugated diene monomers alone or together with aromatic vinyl compounds, in the presence of alkali metal initiators (e.g., those disclosed in Japanese Patent Application, Publication No. 4996/69) or of alkaline earth metal catalysts composed chiefly of such compounds as barium, strontium, calcium or the like, which are normally employed for solution polymerization. When a conjugated diene monomer is to be polymerized, a vinylation agent may be employed for controlling the amount of vinyl linkage of the conjugated diene units in the polymer. Also in case of copolymerizing a conjugated diene monomer and an aromatic vinyl monomer, a polar compound such as an ether compound, amine compound, phosphine compound or the like may be used as the randomizer.

In the copolymerization of a conjugated diene monomer and an aromatic vinyl compound, the aromatic vinyl compound content in the monomeric mixture should not exceed 50% by weight, preferably ranging 5-35% by weight. Useful conjugated diene monomers include 1,3-butadiene, isoprene, 1,3-pentadiene, 2,3-dimethyl-1,3-butadiene and 1,3-hexadiene, etc., and aromatic vinyl compounds include styrene, α-methylstyrene, p-methylstyrene, vinyltoluene and vinylnaphthalene.

As the alkali metal initiators useful for the present invention, the most typical are organolithium initiators such as methyllithium, ethyllithium, n-propyllithium, i-propyllithium, n-butyllithium, secbutyllithium, t-butyllithium, octyllithium, n-decyllithium, phenyllithium, 2-naphthyllithium, 2-butylphenyllithium, 4-phenyl-butyllithium, cyclohexyllithium, 4-cyclopentyllithium, 1,4-dilithio-butene-2, etc., but the initiators are not limited to the above. As the alkaline earth metal initiators, for example, (1) the complexes composed of Ba-tertiary alkoxide/dibutyl Mg, disclosed in Japanese Laid-open Patent Publication No. 48910/77, (2) the complexes composed of organic Li and

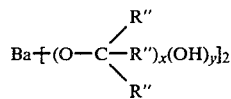

[in which at least one of R″s stands for methyl or cyclohexyl group, the rest of R″(s) standing for $C_1$-$C_6$ alkyl group(s), and x:y=99.5-88:0.5-12 (mol ratio)], disclosed in Japanese Laid-open Patent Publication No. 9090/77, (3) the composite initiators composed of an alcoholate or phenolate of Ba or Mg/organic Li or organic Al, disclosed in Japanese Laid-open Patent Publication No. 112916/81, and (4) those disclosed in Japanese Laid-open Patent Publication Nos. 17591/77, 30543/77, 98077/77, 112916/81, 98077/82, etc. may be used.

The amount of the initiator to be used is normally within the range of 0.2-20 millimoles per 100 g of the monomer(s).

Polymerization temperature normally ranges $-20°$ C.-150° C., preferably 40°-120° C. The polymerization is practiceable either under rising temperatures or under a constant temperature.

The hydrocarbon solvent useful for the present invention may be any of aliphatic, aromatic or alicyclic hydrocarbons, including, for example, propane, n-butane, i-butane, n-pentane, i-pentane, n-hexane, cyclohexane, propene, 1-butene, i-butene, trans-2-butene, cis-2-butene, 1-pentene, 2-pentene, 1-hexene, 2-hexene, benzene, toluene, xylene, and ethylbenzene. Those are preferred examples. More than one of such hydrocarbons may be mixed to serve as the solvent. The ratio of the monomers to the solvent is determined according to the viscosity of polymer solution, and agitation power and heat-removing capacity of the polymerization tank. Generally it is 1:10 to 1:1, by weight.

The tin compounds (1) to be used in this invention are represented by the general formula, $R_a SnX_b$ (in which R is an alkyl, alkenyl, cycloalkyl or aromatic hydrocarbon group, X is a halogen atom, a is an integer of 0-2, and b is an integer of 2-4), which are used for increasing the molecular weight of the polymers by coupling. Specific examples of the tin compounds include methyl trichlorotin, dimethyldichlorotin, tetrachlorotin, dichlorotin, ethyltrichlorotin, diethyldichlorotin, tetrafluorotin, butyltrichlorotin, dibutyldichlorotin, octyltrichlorotin, dioctyldichlorotin, methylchlorotin, dimethyldibromotin, octyltribromotin, tin tetrachloride, tin tetrabromide, tin tetraiodide, cyclohexyl trichlorotin, phenyl trichlorotin, 1,2-bis(trichlorostannyl)ethane, 1,2-bis(methylchlorostannyl)ethane, 1,4-bis(trichlorostannyl)butane, 1,4-bis(methyldichlorostannyl)butane, etc.

The amount of the tin compound (1) may normally range, per mol of the active diene polymer rubber with metal terminals, from 0.1 to 0.9 equivalent based on the halogen atoms in the tin compound (1). The ratio of the coupled polymer (coupling ratio) can be controlled by suitably selecting the amount of the tincompound (1). When it is less than 0.1 equivalent based on its halogen atom; the processability and storage stability of the rubber stock are impaired. Whereas, if it exceeds 0.9 equivalent, rebound of the rubber vulcanizate decreases. The coupling reaction of the metal-terminated active diene polymer rubber with the tin compound (1) is normally performed at 0°-150° C., for 0.5 minute-20 hours.

Of the organic compounds (2) to be used in the present invention, aminoaldehydes, aminoketones, aminothioaldehydes and aminothioketones are aromatic or aliphatic. When aromatic, they should have 1 to 4 amino groups per aromatic ring. The amino group is that represented by the general formula

in which R and R' may be same or different, and are selected from hydrogen and such substituent groups as $C_1$-$C_{12}$ aralkyl groups, cycloalkyl groups, aryl groups, aralkyl groups and alkoxyalkylene groups. When disubstituted, the substituent groups may be same or different. The aromatic ring may contain up to four substituent groups other than above amino groups.

Examples of aromatic organic compounds (2) include 4,4'-diaminobenzophenone, 4,4'-bis(dimethylamino)-benzophenone, 4,4'-bis(diethylamino)-benzophenone, 3-diethylaminobenzophenone, 3,3',5,5'-tetra(dinonylamino)-benzophenone, aminoanthraquinone, N,N-dimethylaminoanthraquinone, 1,4-diaminoanthraquinone, 1,4-N,N-dimethyldiaminoanthraquinone, 1,4-N,N,N',N'-tetramethyldiaminoanthraquinone, phenoxazine, N-methylphenoxazine, 10-butylphenoxazine, 3,7-diamino-10-acetylphenoxazine, acrydone, N-methylacrydone, 4-aminobenzaldehyde, 4-dimethylaminobenzaldehyde, 3,5-bis(dihexylamino)benzaldehyde, 2,4,6-tris(diethylamino)-benzaldehyde, 4-dicyclopentylaminobenzaldehyde, 4,5-bis(diethylamino)-1-naphthaldehyde, and the corresponding thioketones and thioaldehydes.

As the aliphatic organic compounds (2) may be named for example are 3-dimethylaminopropionaldehyde, 3-diethylaminopropionaldehyde, 2-dimethylaminoacetaldehyde, dimethylaminopivalaldehyde, 1,5-bis(di-n-propylamino)-3-pentanone, 5-dodecylamino-n-heptaldehyde, 1,3-bis(diheptylamino)-2-propanone, 1,7-bis(methylethylamino)-4-heptanone, and the corresponding thioaldehydes and thioketones.

Of those, particularly preferred organic compounds (2) are N,N-disubstituted amino compounds.

Of the organic compounds (2), those having in their molecules

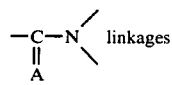 linkages (in which A stands for an oxygen or sulfur atom) include such specific examples as: amide compounds such as formamide, N,N-dimethylformamide, acetamide, N,N-diethylacetamide, aminoacetamide, N,N-dimethyl-N',N'-dimethylaminoacetamide, N,N-dimethylaminoacetamide, N,N'-ethylaminoacetamide, N,N-dimethyl-N'-ethylaminoacetamide, acrylamide, N,N-dimethylacrylamide, N,N-dimethylmethacrylamide, nicotinamide, isonicotinamide, picolinamide, N,N-dimethylisonicotinamide, succinamide, phthalamide, N,N,N',N'-tetramethylphthalamide, oxamide, N,N,N',N'-tetramethyloxamide, 1,2-cyclohexanedicarboxamide, 2-furancarboxamide, N,N-dimethyl-2-furancarboxamide, quinoline-2-carboxamide, N-ethyl-N-methyl-quinolincarboxamide, etc; imide compounds such as succinimide, N-methylsuccinimide maleimide, N-methylmaleimide, phthalimide, N-methylphthalimide, etc.; lactam compounds such as ε-caprolactam, N-methyl-ε-caprolactam, 2-pyrrolidone, N-methyl-2-pyrrolidone, 2-piperidone, N-methyl-2-piperidone, 2-quinolone, N-methyl-2-quinolone, etc.; urea compounds such as urea, N,N'-dimethylurea, N,N-diethylurea, N,N,N',N'-tetramethylurea, N,N-dimethyl-N',N'-diphenylurea, N,N'-dimethylethyleneurea, etc.; carbamic acid derivatives such as methyl carbamate, methyl N,N-diethylcarbamate, etc.; isocyanuric acid and derivatives thereof such as N,N',N''-trimethylisocyanuric acid; and the corresponding sulfur-containing compounds. Of the foregoing, those compounds of which N atoms have at least one substituent group similar to the aforesaid amino group are particularly preferred.

The amount of use of the organic compound (2) is selected within the range of 0.1–0.9 mol per mol of the metal-terminated active diene polymer rubber. When it is less than 0.1 mol, the rubber vulcanizate exhibits inferior rebound, but if it exceeds 0.9 mol, the rubber stock shows inferior processability and storage stability. The reaction temperature and time are variable over wide ranges, but generally the former ranges from room temperature to 100° C., and the latter, from several seconds to several hours.

Furthermore, it is particularly desirable for this invention to use active diene polymer rubbers containing the polymer chains with dienyl-metal terminals, i.e., copolymer rubbers of conjugated diene monomer(s) and aromatic vinyl monomer(s) having dienyl-alkali metal and/or dienyl-alkaline earth metal terminals, as such still enhances the effect of the present invention.

After the reaction is terminated, the modified diene polymer rubber is coagulated from the reaction system. The coagulation is effected by the methods ordinarily practiced in the production of rubber by solution polymerization, such as the addition of a coagulating agent such as alcohol (e.g., methanol or ethanol) to the reaction system, or steam stripping. The coagulation temperature neither is limited. The crumbs separated from the reaction system can be dried with the devices conventionally employed in production of synthetic rubber, such as a band dryer, extrusiontype dryer, etc. The drying temperature is subject to no specific limitation.

Thus obtained diene polymer rubber exhibits improved processability and storage stability, and also provides a vulcanizate exhibiting well-balanced rolling resistance (rebound) and wet skid resistance, and hence is extremely useful as the material rubber for tire tread.

Hereinafter the present invention will be more specifically explained with reference to working examples.

EXAMPLE 1

A 2-liter stainless steel polymerization reactor was washed and dried, and its inside air was substituted with dry nitrogen. Thereafter the reactor was charged with 120 g of 1,3-butadiene, 40 g of styrene, 840 g of cyclohexane, 0.5 millimole of tetramethylethylenediamine and 1.2 millimole of n-butyllithium (n-hexane solution). The polymerization was performed at 45° C. for 5 hours under stirring of the content. After the polymerization reaction terminated, tin tetrachloride of the amount indicated in Table 1 was added, followed by further 30 minutes' reaction. Further an organic compound specified in Table 1 was added to the system, followed by 30 minutes' addition reaction. Then the reaction was stopped by addition of 5 ml of methanol, and the polymer solution was poured into a 1.5 wt % 2,6-di-t-butyl-p-cresol (BHT) solution in methanol so as to coagulate the formed polymer, which was subsequently dried at 60° C. for 24 hours under a reduced pressure.

Thus obtained polymer was measured of the vinyl content and styrene content by infrared spectroscopic analysis [Hampton Anal. Chem. 21. 923 (1949)]. Also the coupling ratio was determined from the ratio of high molecular weight area to the total area in the gel permeation chromatogram. The measuring conditions of gel permeation chromatography were as below.

Column: GMH-6 manufactured by Toyo Soda K.K., two columns
Temperature: 38° C.
Flow rate: 1.2 ml/min.

The ratio of organic compound (2) added to the active polymer terminals (addition ratio) was determined by the following method. After the reaction with tin tetrachloride, a part of the solution (I) in which the active polymer still remained was sampled and reacted with Michler's Ketone [4,4'-bis(dimethylamino)benzophenone]. The amount of Michler's Ketone added to the polymer was calculated from the absorption intensity at 310 nm, to determine the concentration (A) of the active polymer in the solution (I). Then the organic compound (2) was added to the solution (I) and reacted for a predetermined period, and to which Michler's Ketone was added. From the added amount of Michler's Ketone measured herein, the concentration (B) of the polymer to which the organic compound (2) was not added was determined. Thus the addition ratio was calculated from the equation below:

$$\text{Addition ratio (\%)} = \frac{(A) - (B)}{(A)} \times 100.$$

The polymer structures and Mooney viscosities (ML$_{1+4}$,100° C.) of the polymer rubbers formed were as shown Table 1.

so-called "bagging" condition, the property was indicated as "poor".

The extrudability test was run in accordance with

TABLE 1

| Run No. | Organic compound (2) Compound | Amount added (millimole) | Tin compound (1) Tin tetrachloride (millimole) | Vinyl content (%) | Styrene content (%) | Mooney viscosity | Coupling ratio (%) | Addition ratio (%) |
|---|---|---|---|---|---|---|---|---|
| Examples of this invention | | | | | | | | |
| 1 | 4,4'-bis(dimethylamino)benzophenone | 0.6 | 0.1 | 42.0 | 24.9 | 42 | 43 | 51 |
| 2 | " | 0.4 | 0.15 | 43.3 | 25.2 | 50 | 61 | 36 |
| 3 | " | 0.8 | 0.05 | 43.3 | 25.0 | 34 | 20 | 77 |
| 4 | 4,4'-bis(dimethylamino)thiobenzophenone | 0.6 | 0.1 | 42.0 | 24.9 | 40 | 40 | 54 |
| 5 | 4,4'-bis(diethylamino)benzophenone | 0.6 | 0.1 | 41.1 | 24.8 | 43 | 41 | 53 |
| 6 | 4,4'-diaminobenzophenone | 0.6 | 0.1 | 43.3 | 25.3 | 41 | 39 | 53 |
| 7 | N,N—dimethylanthraquinone | 0.6 | 0.1 | 43.6 | 25.0 | 42 | 39 | 51 |
| 8 | 4-dimethylaminobenzaldehyde | 0.6 | 0.1 | 42.4 | 25.0 | 42 | 42 | 52 |
| 9 | 3,5-bis(dimethylamino)benzaldehyde | 0.6 | 0.1 | 42.4 | 24.7 | 40 | 43 | 53 |
| 10 | dimethylaminopivalic aldehyde | 0.6 | 0.1 | 43.0 | 25.0 | 41 | 40 | 50 |
| Control examples | | | | | | | | |
| 11 | — | — | 0.05 | 41.1 | 25.3 | 33 | 19 | — |
| 12 | — | — | 0.1 | 43.3 | 25.0 | 41 | 43 | — |
| 13 | — | — | 0.2 | 42.4 | 24.9 | 60 | 79 | — |
| 14 | — | — | 0 | 43.6 | 24.9 | 22 | 0 | — |
| 15 | 4,4'-bis(dimethylamino)benzophenone | 1.0 | 0 | 42.4 | 25.0 | 23 | 0 | 90 |
| 16 | " | 0.96 | 0.01 | 42.0 | 25.1 | 25 | 4 | 90 |
| 17 | " | 0.04 | 0.24 | 42.4 | 25.0 | 70 | 95 | 3 |

Thus obtained polymer rubbers were kneaded with various compounding agents following the compounding recipe of Table 2, in a 250 ml. Brabender-type mixer to provide rubber compositions which were press-cured at 160° C. for 25 minutes to provide test specimen.

TABLE 2

| Compounding recipe | |
|---|---|
| Polymer rubber | 100 parts by weight |
| Zinc oxide No. 3 | 3 parts by weight |
| Stearic acid | 2 parts by weight |
| Sulfur | 1.75 parts by weight |
| HAF carbon black | 50 parts by weight |
| Aromatic process oil | 5 parts by weight |
| N—cyclohexyl-2-benzo-thiazole sulphenamide | 1.1 parts by weight |

The processability of the rubber compositions was evaluated by their Mooney viscosities, roll-winding property and extrudability.

The rubber composition was wound onto 6-inch rolls of 50° C. installed as spaced by 1.5 mm, and its state at one minute after the winding was observed to evaluate its roll-winding property. When the composition fastly wound around the rolls, the property was graded "excellent", and if it only loosely wound around the rolls, the grade given was "good". Whereas, if it failed completely to wind around the rolls, i.e., brought about Method A of ASTM D2230-78. The composition was extruded at the barrel, head and die temperatures at 100° C. and the screw rotation speed of 30 rpm, and the state of extrudate was graded according to Rating System A of ASTM D2230-78. When the sum of four rating items on shape was 16-14, the extrudability was graded "excellent"; 13-11, "good", and 10 and less, "poor".

Cold flow was evaluated based o the elongation of No. 3 dumbbell (specified in JIS K-6301) shaped specimen. That is, the rubber was hot-pressed at 100° C. for 5 minutes and then cooled with water for 30 minutes or longer while still kept under pressure, to form a 2-mm thick sheet. From the sheet above-specified dumbbell shaped test peace was punched out, which was hung in 23° C. atmosphere with its one end fixed, and its elongation by its empty weight was measured as the index of cold flow. The elongation was determined from the lengths of bench mark drawn at the central portion of the test peace. When the elongation after 300 minutes' hanging was less than 10%, the cold flow was evaluated "low"; from 10% to below 40%, "medium"; and 40% or more, "high".

The rebound of vulcanized rubber was measured at 50° C. with Dunlop tripsometer. Wet skid resistance was measured at 23° C., with a portable skid tester made by Stanley Co., on the road surface (ASTM E-303-74, outside type B, black, safety walk made by MMM Co.).

The results are shown in Table 3.

TABLE 3

| Run No. | Processability Mooney viscosity of composition | Roll-winding property | Extrudability | Rebound (%) | Wet skid resistance | Cold flowability |
|---|---|---|---|---|---|---|
| Examples of this invention | | | | | | |
| 1 | 80 | excellent | good | 59 | 77 | medium |
| 2 | 83 | " | " | 58 | 77 | low |
| 3 | 90 | good | " | 60 | 77 | medium |
| 4 | 85 | excellent | " | 61 | 77 | " |
| 5 | 88 | " | " | 61 | 76 | " |
| 6 | 83 | " | " | 60 | 77 | " |
| 7 | 84 | " | " | 59 | 77 | " |

TABLE 3-continued

| | Processability | | | | | |
|---|---|---|---|---|---|---|
| Run No. | Mooney viscosity of composition | Roll-winding property | Extrudability | Rebound (%) | Wet skid resistance | Cold flowability |
| 8 | 85 | " | " | 59 | 77 | " |
| 9 | 85 | " | " | 61 | 77 | " |
| 10 | 84 | " | " | 60 | 77 | " |
| Control examples | | | | | | |
| 11 | 65 | good | excellent | 53 | 76 | " |
| 12 | 69 | excellent | " | 54 | 77 | " |
| 13 | 78 | good | " | 55 | 77 | low |
| 14 | 63 | " | " | 51 | 77 | high |
| 15 | 115 | poor | poor | 63 | 77 | high |
| 16 | 113 | " | " | 63 | 77 | high |
| 17 | 82 | good | good | 56 | 77 | low |

From the results of Table 3, it could be understood that the vulcanizates of butadiene-styrene copolymer rubbers obtained through the present process excel in the balance of rolling resistance (rebound) and wet skid resistance, and that the rubber compositions have good processability and storage stability.

EXAMPLE 2

Under the identical conditions employed in Example 1 except the organic compounds (2) as specified in Table 4 were used, butadiene-styrene copolymer rubbers were prepared. The structures and Mooney viscosities of the rubbers were as shown in Table 4.

Those rubbers were subjected to the same tests as performed in Example 1, with the results as shown in Table 5.

TABLE 4

| Run No. | Organic compound (2) | | Tin compound (1) | | | | | |
|---|---|---|---|---|---|---|---|---|
| | Compound | Amount added (millimole) | Tin tetrachloride (millimole) | Vinyl content (%) | Styrene content (%) | Mooney viscosity | Coupling ratio (%) | Addition ratio (%) |
| Examples of this invention | | | | | | | | |
| 18 | N,N,N',N'—tetraethylaminoacetamide | 0.6 | 0.1 | 42.3 | 25.0 | 43 | 45 | 48 |
| 19 | " | 0.4 | 0.15 | 43.0 | 24.8 | 48 | 58 | 34 |
| 20 | " | 0.8 | 0.15 | 42.8 | 24.9 | 35 | 18 | 75 |
| 21 | N,N,N',N'—tetramethylurea | 0.6 | 0.1 | 42.0 | 25.0 | 38 | 40 | 50 |
| 22 | nicotinamide | 0.6 | 0.1 | 41.6 | 24.8 | 44 | 38 | 51 |
| 23 | N,N—dimethylformamide | 0.6 | 0.1 | 42.9 | 25.1 | 40 | 40 | 49 |
| 24 | N,N,N',N'—tetramethylthiourea | 0.6 | 0.1 | 43.6 | 25.0 | 42 | 39 | 48 |
| 25 | N—methyl-2-indolinone | 0.6 | 0.1 | 42.4 | 25.0 | 42 | 42 | 49 |
| 26 | N—methyl-ε-caprolactam | 0.6 | 0.1 | 42.4 | 24.7 | 40 | 43 | 51 |
| 27 | N—methylpyrrolidone | 0.6 | 0.1 | 42.4 | 24.8 | 43 | 40 | 52 |
| Control examples | | | | | | | | |
| 28 | N—methyl-2-indolinone | 1.0 | 0 | 42.4 | 25.0 | 23 | 0 | 88 |
| 29 | " | 0.96 | 0.01 | 42.0 | 25.1 | 25 | 4 | 89 |
| 30 | " | 0.04 | 0.24 | 42.4 | 25.0 | 70 | 95 | 4 |

TABLE 5

| | Processability | | | | | |
|---|---|---|---|---|---|---|
| Run No. | Mooney viscosity of composition | Roll-winding property | Extrudability | Rebound (%) | Wet skid resistance | Cold flowability |
| Examples of this invention | | | | | | |
| 18 | 81 | excellent | good | 60 | 77 | medium |
| 19 | 82 | " | " | 59 | 77 | low |
| 20 | 88 | good | " | 58 | 77 | medium |
| 21 | 86 | excellent | " | 60 | 77 | " |
| 22 | 89 | " | " | 59 | 76 | " |
| 23 | 85 | " | " | 58 | 77 | " |
| 24 | 84 | " | " | 59 | 77 | " |
| 25 | 85 | " | " | 59 | 77 | " |
| 26 | 85 | " | " | 61 | 77 | " |
| 27 | 88 | " | " | 61 | 77 | " |
| Control examples | | | | | | |
| 28 | 115 | poor | poor | 63 | 77 | high |
| 29 | 113 | " | " | 63 | 77 | high |
| 30 | 82 | good | good | 56 | 77 | low |

EXAMPLE 3

Polymerization was performed under identical conditions with Example 1, except that 160 g of 1,3-butadiene was used as the monomer. After the polymerization reaction 0.1 millimole of tin tetrachloride was added and reacted for 30 minutes. Subsequently the compounds specified in Table 6 were added, followed by 30 minutes' reaction.

The structures of resultant polybutadiene rubbers were as shown in Table 6.

Those polybutadienes were formulated into the rubber compositions and vulcanizates following the same compounding recipe employed in Example 1, and their workability, rebound, wet skid resistance and cold flow were measured with the results as shown in Table 7.

TABLE 6

| | Organic compound (2) | | Tin compound (1) | | | | |
|---|---|---|---|---|---|---|---|
| Run No. | Compound | Amount added (millimole) | Tin tetrachloride (millimole) | Vinyl content (%) | Mooney viscosity | Coupling ratio (%) | Addition ratio (%) |
| Examples of this invention | | | | | | | |
| 31 | 4,4'-bis(dimethylamino)benzophenone | 0.6 | 0.1 | 50.5 | 36 | 40 | 54 |
| 32 | 4,4'-bis(dimethylamino)thiobenzophenone | 0.6 | 0.1 | 51.0 | 34 | 40 | 56 |
| 33 | 4,4'-bis(diethylamino)benzophenone | 0.6 | 0.1 | 51.0 | 35 | 42 | 55 |
| 34 | 4,4'-diaminobenzophenone | 0.6 | 0.1 | 50.8 | 35 | 42 | 55 |
| 35 | 4-dimethylaminobenzaldehyde | 0.6 | 0.1 | 50.0 | 34 | 40 | 56 |
| 36 | N,N,N',N'—tetraethylaminoacetamide | 0.6 | 0.1 | 50.5 | 35 | 41 | 52 |
| 37 | N,N—dimethylformamide | 0.6 | 0.1 | 51.0 | 36 | 39 | 53 |
| 38 | N—methyl-ε-caprolactam | 0.6 | 0.1 | 50.0 | 34 | 40 | 54 |
| 39 | N—methylpyrrolidone | 0.6 | 0.1 | 51.0 | 37 | 41 | 55 |
| Control examples | | | | | | | |
| 40 | — | 0 | 0.1 | 50.0 | 35 | 43 | 0 |
| 41 | 4,4'-bis(dimethylamino)benzophenone | 1.0 | 0 | 51.0 | 22 | 0 | 93 |
| 42 | N—methyl-ε-caprolactam | 1.0 | 0 | 51.0 | 22 | 0 | 89 |

TABLE 7

| | Processability | | | | | |
|---|---|---|---|---|---|---|
| Run No. | Mooney viscosity of composition | Roll-winding property | Extrudability | Rebound (%) | Wet skid resistance | Cold flowability |
| Examples of this invention | | | | | | |
| 31 | 79 | good | good | 63 | 72 | medium |
| 32 | 78 | " | " | 63 | 72 | " |
| 33 | 80 | " | " | 64 | 72 | " |
| 34 | 77 | " | " | 62 | 72 | " |
| 35 | 80 | " | " | 63 | 72 | " |
| 36 | 79 | " | " | 62 | 72 | " |
| 37 | 78 | " | " | 62 | 72 | " |
| 38 | 80 | " | " | 63 | 72 | " |
| 39 | 83 | " | " | 64 | 72 | " |
| Control examples | | | | | | |
| 40 | 70 | " | excellent | 52 | 72 | " |
| 41 | 110 | poor | poor | 65 | 72 | high |
| 42 | 110 | " | " | 65 | 72 | " |

EXAMPLE 4

Example 1 was repeated except that after the polymerization reaction, further 1 g of butadiene was added to convert the polymer terminals to butadienyllithium, and the active polymers were reacted with tin tetrachloride (0.1 millimole) and 4,4'-bis(dimethylamino)-benzophenone (0.6 millimole) or N-methyl-ε-caprolactam (0.6 millimole), to provide styrene-butadiene copolymer rubbers.

The processability of the rubber compositions, properties of the vulcanizates, and cold flow were evaluated by the methods similar to those employed in Example 1, with the results as shown in Table 8.

TABLE 8

| | Run No | |
|---|---|---|
| | 43* | 44** |
| Processability of Composition | | |
| Compound Mooney viscosity | 78 | 78 |
| Roll-winding property | excellent | excellent |

TABLE 8-continued

| | Run No | |
|---|---|---|
| | 43* | 44** |
| Extrudability | good | good |
| Vulcanizate's properties | | |
| Rebound (%) | 65 | 65 |
| Wet skid resistance | 77 | 77 |
| Cold Flow | low | low |

Notes
*4,4'-Bis(dimethylamino)benzophenone was used as the organic compound (2). Coupling ratio was 40%, and addition ratio was 52%.
**N—methyl-ε-caprolactam was used as the organic compound (2). Coupling ratio was 43%, and addition ratio was 48%.

As is apparent from Table 8, by the butadienetin linkages and addition of the organic compounds, copolymer rubber which give vulcanizates of still improved balance between the rebound and wet skid resistance, and rubber compositions of excellent processability and storage stability can be obtained.

EXAMPLE 5

A 2-liter stainless steel polymerization reactor was washed, dried and purged with dry nitrogen. Then, 200 g of 1,3-butadiene and 800 g of n-hexane were added and uniformly mixed. Then, n-butyllithium, dibutylmagnesium, triethylaluminum and barium dinonyl phenoxide were added in this sequence so that the mole ratio of the catalyst, Ba/Mg/Li/Al, became 1/1.5/1.5/2, and the ratio of 1,3-butadiene/n-butyllithium became 300 (grams/millimole). The polymerization was subsequently performed at 50° C. for 15 hours. After the polymerization, 0.1 millimole of tin tetrachloride was added, and the mixture was stirred for 30 minutes. Subsequently, 0.6 millimole of N-methyl-2-pyrrolidone (10 ml) was added, and the mixture was further stirred for 30 minutes. The reaction mixture was then taken out into a 1.5% by weight methanol solution of BHT to coagulate the resulting polymer. The polymer was then dried at 60° C. under reduced pressure for 24 hours.

The Mooney viscosity of the resulting polymer was 53.0. The microstructure of the polymer determined by the Morero method using an infrared spectrometer were as follows:

| | |
|---|---|
| cis-1,4 | 17.1% |
| trans-1,4 | 76.9% |
| Vinyl | 6.0% |

A polymer was prepared as above except that N-methyl-2-pyrrolidone and tin tetrachloride were not added. The resulting polymer had a Mooney viscosity of 40.0, and the same microstructure as above.

Each of the two polymer rubbers was kneaded with the various compounding agents in accordance with the compounding recipe of Example 1 on a roll, and the resulting rubber compositions were press-cured at 160° C. for 25 minutes.

The processability of the rubber compositions, properties of the vulcanizates, and cold flow were evaluated by the methods similar to those employed in Example 1. The results are shown in Table 9.

TABLE 9

| | Run No. | |
|---|---|---|
| | 45* | 46** |
| Processability of composition | | |
| Compound Mooney viscosity | 80 | 75 |
| Roll-winding property | good | poor |
| Extrudability | good | poor |
| Vulcanizate's properties | | |
| Rebound (%) | 63.0 | 57.9 |
| Wet skid resistance | 54.0 | 54.0 |
| Cold flow | low | high |

Notes
*Coupling ratio 40%, and addition ratio, 49%.
**Comparison using the polymer rubber before coupling and addition reaction.

What we claim is:

1. A process for making a diene polymer rubber which comprises reacting an active diene polymer rubber having alkali metal and/or alkaline earth metal terminals, which is obtained by polymerizing a conjugated diene monomer alone or together with an aromatic vinyl monomer in a hydrocarbon solvent, using an alkali metal and/or alkaline earth metal initiator, with
(1) a tin compound expressed by the general formula $R_aSnX_b$ (in which R stands for an alkyl, alkenyl, cycloalkenyl or aromatic hydrocarbon group; X is a halogen atom; a is an integer of 0-2, and b is an integer of 2-4), and
(2) at least one organic compound selected from the group consisting of aminoaldehydes, aminoketones, aminothioaldehydes, aminothioketones and the organic compounds having in their molecules

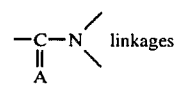 linkages in which A stands for an oxygen or sulfur atom).

2. The process of claim 1 in which the active diene polymer rubber is a homopolymer rubber of a conjugated diene monomer.

3. The process of claim 1 in which the active diene polymer rubber is a copolymer rubber of a conjugated diene monomer and an aromatic vinyl monomer, having dienyl-alkali metal and/or dienyl-alkaline earth metal terminals.

4. The process of claim 1 in which a monomeric mixture of a conjugated diene monomer and an aromatic vinyl monomer having the aromatic vinyl monomer content of not higher than 50% by weight is used.

5. The process of claim 1 in which the monomer(s) and hydrocarbon solvent are used at the weight ratios ranging from 1:10–1:1.

6. The process of claim 1 in which the active diene polymer rubber is first reacted with the tin compound (1) and then with the organic compound (2).

7. The process of claim 1 in which the active diene polymer rubber is first reacted with the organic compound (2) and then with the tin compound (1).

8. The process of claim 1 in which the active diene polymer rubber is reacted simultaneously with the tin compound (1) and organic compound (2).

9. The process of claim 1 in which the active diene polymer rubber is reacted with 0.1–0.9 equivalent of the tin compound (1) based on the halogen atom(s) in the tin compound (1), per mol of said polymer rubber.

10. The process of claim 1 in which the active diene polymer rubber is reacted with 0.1–0.9 mole of the organic compound (2), per mole of said polymer rubber.

11. The process of claim 1 wherein the tin compound (1) is selected from the group consisting of methyl trichlorotin, dimethyldichlorotin, tetrachlorotin, dichlorotin, ethyltrichlorotin, diethyldichlorotin, tetraflurotin, butyltrichlorotin, dibutyldichlorotin, octyltrichlorotin, dioctyldichlorotin, methylchlorotin, dimethyldibromotin, octyltribromotin, tin tetrachloride, tin tetrabromide, tin tetraiodide, cyclohexyl trichlorotin, phenyl trichlorotin, 1,2-bis(trichlorostannyl)ethane, 1,2-bis(methylchlorostannyl)ethane, 1,4-bis(trichlorostannyl) butane, and 1,4-bis(methyldichlorostannyl)butane.

12. The process of claim 1 wherein the at least one organic compound (2) is an aromatic organic compound selected from the group consisting of 4,4'-diaminobenzophenone, 4,4'-bis(dimethylamino)-benzophenone, 4,4'-bis(diethylamino)benzophenone, 3-diethylaminobenzophenone, 3,3',5,5'-tetra(dinonylamino)-benzophenone, aminoanthraquinone, N,N-dimethylaminoanthraquinone, 1,4-diaminoanthraquinone, 1,4-N,N-dimethyldiaminoanthraquinone, 1,4-N,N,N',N'-tetramethyldiaminoanthraquinone, phenoxazine, N-methylphenoxazine, 10-butylphenoxazine, 3,7-diamino-10-acetylphenoxazine, acrydone, N-methylacrydone, 4-aminobenzaldehyde, 4-dimethylaminobenzaldehyde, 3,5-bis(dihexylamino)-benzaldehyde, 2,4,6-tris(diethylamino)-benzaldehyde, 4-dicyclopentylaminobenzaldehyde, 4,5-bis(diethylamino)-1-naphthaldehyde, and the corresponding thioketones and thioaldehydes.

13. The process of claim 1 wherein the at least one organic compound (2) is an aliphatic organic compound selected from the group consisting of 3-dimethylaminopropionaldehyde, 3-diethylaminopropionaldehyde, 2-dimethylaminoacetaldehyde, dimethylaminopivalaldehyde, 1,5-bis(di-n-propylamino)3-pentanone, 5-dodecylamino-n-neptaldehyde, 1,3-bis(diheptylamino)-2-propanone, 1,7-bis(methylethylamino)-4-heptanone, and the corresponding thioaldehydes and thioketones.

14. The process of claim 1 wherein the at least one organic compound (2) is the organic compound having the

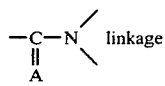

and is a compound selected from the group consisting of formamide, N,N-dimethylformamide, acetamide, N,N-diethylacetamide, aminoacetamide, N,N-dimethyl-N', N'-dimethylaminoacetamide, N,N-dimethylaminoacetamide, N,N'-ethylaminoacetamide, N,N-dimethyl-N'-ethylaminoacetamide, acrylamide, N,N-dimethylacrylamide, N,N-dimethylmethacrylamide, nicotinamide, isonicotinamide, picolinamide, N,N-dimethylisonicotinamide, succinamide, phthalamide, N,N,N',N'-tetramethylphthalamide, oxamide, N,N,N',N'-tetramethyloxamide, 1,2-cyclohexanedicarboxamide, 2-furancarboxamide, quinoline-2-carboxamide, N-ethyl-N-methylquinolincarboxamide, succinimide, N-methylsuccinimide maleimide, N-methylmaleimide, phthalimide, N-methylphthalimide, ε-caprolactam, N-methyl-ε-caprolactam, 2-pyrrolidone, N-methyl-2-pyrrolidone, 2-piperidone, N-methyl-2-piperidone, 2-quinolone, N-methyl-2-quinolone, urea, N,N'-dimethylurea, N,N-diethylurea, N,N,N',N'-tetramethylurea, N,N-dimethyl-N',N'-diphenylurea, N,N'-dimethylethyleneurea, methyl carbamate, methyl N,N-diethylcarbamate, N,N',N''-trimethylisocyanuric acid, and the corresponding sulfur-containing compounds.

* * * * *